United States Patent
Silver (10) Patent No.: US 12,146,553 B2
(45) Date of Patent: Nov. 19, 2024

(54) SLIDING PIN-YOKE MECHANISM (71) Applicant: Raytheon Company, Tewksbury, MA (US)

(72) Inventor: Stephen C. Silver, Somerville, AL (US)

(73) Assignee: Raytheon Company, Tewksbury, MA (US)

( * ) Notice: Subject to any disclaimer, the term of this patent is extended or adjusted under 35 U.S.C. 154(b) by 121 days.

(21) Appl. No.: 17/820,535

(22) Filed: Aug. 17, 2022

(65) Prior Publication Data
US 2024/0060552 A1 Feb. 22, 2024

(51) Int. Cl.
*F16H 25/24* (2006.01)
*F16H 25/20* (2006.01)
*F16H 25/22* (2006.01)
*F42B 10/64* (2006.01)

(52) U.S. Cl.
CPC ......... *F16H 25/24* (2013.01); *F16H 25/2204* (2013.01); *F42B 10/64* (2013.01); *F16H 2025/2084* (2013.01)

(58) Field of Classification Search
CPC ................ F16H 25/24; F16H 25/2204; F16H 2025/2084; F16H 21/44; F16H 2025/2043; F16H 2025/2075; F42B 10/64
See application file for complete search history.

(56) References Cited

U.S. PATENT DOCUMENTS

| | | | |
|---|---|---|---|
| 2,867,070 A | 1/1959 | McCall et al. | |
| 3,088,324 A | 5/1963 | Strang et al. | |
| 3,704,986 A | 12/1972 | Sheesley et al. | |
| 4,116,109 A | 9/1978 | Ervine | |
| 4,265,132 A | 5/1981 | Robertson | |
| 5,546,897 A | 8/1996 | Brackett | |
| 6,186,098 B1 | 2/2001 | Choi | |
| 8,921,749 B1 | 12/2014 | Scott | |
| 9,290,272 B1 * | 3/2016 | Hoover | B64D 11/0639 |
| 10,088,056 B2 | 10/2018 | McAuliffe et al. | |
| 11,964,751 B2 * | 4/2024 | Edwards | B64C 13/28 |
| 2016/0329798 A1 * | 11/2016 | Himmelmann | B64C 13/36 |
| 2017/0313409 A1 * | 11/2017 | Edwards | B64C 5/02 |
| 2019/0000004 A1 * | 1/2019 | Sloneker | A01C 5/064 |
| 2023/0291275 A1 * | 9/2023 | Edwards | H02K 7/075 |
| 2023/0384069 A1 * | 11/2023 | Silver | B64C 13/50 |

FOREIGN PATENT DOCUMENTS

| | | |
|---|---|---|
| EP | 2216619 A2 | 8/2010 |
| GB | 2260954 A | 5/1993 |

OTHER PUBLICATIONS

International Search Report and Written Opinion issued for related International Application No. PCT/US2023/022637, mailed Aug. 10, 2023.

* cited by examiner

Primary Examiner — Joshua J Michener
Assistant Examiner — Cindi M Curry
(74) Attorney, Agent, or Firm — Schwegman Lundberg & Woessner, P.A.

(57) ABSTRACT

A linear actuation system includes a pin pivotably coupled to an output rod of a linear motion actuator and a rotatable output shaft that includes a bushing therein. The pin can be configured to slide in and out of the bushing in response to movement of the linear motion actuator. The linear motion actuator and the output shaft can be arranged such that travel of the pin in the bushing causes rotation of the output shaft.

20 Claims, 10 Drawing Sheets

SLIDING PIN-YOKE MECHANISM

FIELD OF DISCLOSURE

The disclosure relates to linear motion actuation systems.

DESCRIPTION OF RELATED ART

Various applications require conversion of linear motion of an actuator into rotational motion of an output shaft. Traditionally, a scotch yoke mechanism is employed where a pin on an output rod of the actuator engages a slot in the output shaft. Movement of the output rod causes the pin to slide along the slot and cause rotation of the output shaft. Such traditional scotch yokes have several drawbacks. First, because the scotch yoke relies on pin sliding along the slot to drive rotation of the output shaft, tight machine tolerances of the slot are required. Additionally, because the scotch yoke relies on the contact point between the pin and the sides of the slot, high contact forces on either the pin or the slot can cause deformation of the pin and/or the slot. Moreover, traditional scotch yokes are difficult assemble because small pins have to be aligned with and maintain placement in tightly machined slots, especially if a dual slot scotch yoke is used where pins are on opposing sides of the output rod.

SUMMARY

A linear actuation system includes a pin pivotably connected to an output rod of a linear actuator to pivot about the output rod as the linear actuator moves the output rod. The pin is further configured to slide into and out of a bushing in an output shaft as the pin pivots to rotate the output shaft. The linear actuation system can be used to actuate a fin of a vehicle and the bushing can serve multiple purposes, namely it is the structure used by the pin to rotate the output shaft while also acting as a pivot point of the fin.

According to an aspect of the disclosure, A linear actuation system comprises: a pin pivotably coupled to an output rod of a linear motion actuator; and a rotatable output shaft that includes a bushing therein, wherein the pin is configured to slide in and out of the bushing in response to movement of the linear motion actuator, wherein the linear motion actuator and the output shaft are arranged such that travel of the pin in the bushing causes rotation of the output shaft.

According to an embodiment of any paragraph(s) of this summary, the linear motion actuator comprises a pneumatic actuator.

According to an embodiment of any paragraph(s) of this summary, the linear motion actuator comprises a hydraulic actuator.

According to an embodiment of any paragraph(s) of this summary, the output rod of the linear motion actuator includes a screw thread and a ball nut on the screw thread, wherein the pin is pivotably coupled to the ball nut.

According to an embodiment of any paragraph(s) of this summary, a central axis of the pin is offset from a center of the screw thread.

According to an embodiment of any paragraph(s) of this summary, the pin is made of a first material, wherein the bushing is made of a second material, wherein the second material has a coefficient of friction lower than the first material.

According to an embodiment of any paragraph(s) of this summary, the output shaft further includes a lubricant, wherein the bushing includes channels to store a portion of the lubricant therein.

According to an embodiment of any paragraph(s) of this summary, further comprising a control surface pivotably attached to the output shaft, wherein rotation of the output shaft causes pivoting of the control surface, wherein the bushing defines the pivot point of the control surface.

According to an embodiment of any paragraph(s) of this summary, the linear motion actuator and the output shaft are further arranged such that a maximum rotation of the output shaft is 30 degrees.

According to an embodiment of any paragraph(s) of this summary, a gear ratio of the linear actuation system increases based on an angle of the pin relative to the output shaft.

According to an embodiment of any paragraph(s) of this summary, the output shaft is movably connected to a chassis of an aerial vehicle.

According to an embodiment of any paragraph(s) of this summary, the linear actuation system is in a plurality of linear actuation systems each separately attached to the chassis of the aerial vehicle.

According to an embodiment of any paragraph(s) of this summary, the linear motion actuator is connected to a control system that selectively activates the linear motion actuator.

According to another aspect of the disclosure, A method of forming a linear actuation system for an aerial vehicle comprises: pivotably coupling a pin to an output rod of a linear motion actuator; inserting the pin in a bushing of a rotatable output shaft such that the pin is configured to slide in and out of the bushing in response to movement of the linear motion actuator; and arranging the linear motion actuator and the output shaft such that motion of the output rod of the linear motion actuator causes rotation of the output shaft.

According to an embodiment of any paragraph(s) of this summary, pivotably coupling the pin to the output rod includes offsetting a central axis of the pin from the center of the output rod when the pin is pivotably coupled to the output rod.

According to an embodiment of any paragraph(s) of this summary, the output rod includes a screw thread and a ball nut on the screw thread, wherein pivotably coupling the pin to the output rod includes pivotably coupling the pin to the ball nut.

According to an embodiment of any paragraph(s) of this summary, comprising pivotably attaching a control surface of the aerial vehicle to the output shaft such that bushing is a pivot point of the control surface.

According to an embodiment of any paragraph(s) of this summary, comprising movably securing the output shaft to a chassis of the aerial vehicle.

According to yet another aspect of the disclosure, A control surface actuation system of an aerial vehicle comprises: a chassis, wherein the chassis includes a first connection and a second connection; a first linear actuation system movably connected to the chassis at the first connection, wherein the first linear actuation system comprises: a first pin pivotably coupled to a first output rod of a first linear motion actuator; and a first rotatable output shaft that includes a first bushing therein, wherein the first pin is configured to slide in and out of the first bushing in response to movement of the first linear motion actuator, wherein the first linear motion actuator and the first output shaft are arranged such that travel of the pin in the first bushing causes rotation of the first output shaft; a first control surface pivotably attached to the first output shaft pivotably attached to the output shaft, wherein rotation of the first output shaft causes pivoting of the first control surface, wherein the first bushing defines the pivot point of the first control surface; a second linear actuation system movably connected to the chassis at the second connection, wherein the second linear actuation system comprises: a second pin pivotably coupled to a second output rod of a second linear motion actuator; and a second rotatable output shaft that includes a second bushing therein, wherein the second pin is configured to slide in and out of the second bushing in response to movement of the second linear motion actuator, wherein the second linear motion actuator and the second output shaft are arranged such that travel of the pin in the second bushing causes rotation of the second output shaft; and a second control surface pivotably attached to the second output shaft pivotably attached to the output shaft, wherein rotation of the second output shaft causes pivoting of the second control surface, wherein the second bushing defines the pivot point of the second control surface.

According to an embodiment of any paragraph(s) of this summary, a central axis of the first pin is offset from a center of the first output rod, wherein a central axis of the second pin is offset from a center of the second output rod.

To the accomplishment of the foregoing and related ends, the disclosure comprises the features hereinafter fully described and particularly pointed out in the claims. The following description and the annexed drawings set forth in detail certain illustrative embodiments of the disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects of the disclosure.

DETAILED DESCRIPTION

Aspects of the present application pertain to a linear actuation system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

In reference to the disclosure herein, for purposes of convenience and clarity only, directional terms, such as, top, bottom, left, right, up, down, upper, lower, over, above, below, beneath, rear, and front, may be used. Such directional terms should not be construed to limit the scope of the features described herein in any manner. It is to be understood that embodiments presented herein are by way of example and not by way of limitation. The intent of the following detailed description, although discussing exemplary embodiments, is to be construed to cover all modifications, alternatives, and equivalents of the embodiments as may fall within the spirit and scope of the features described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

Disclosed is linear actuation system for converting linear movement to rotation of an output shaft to actuate a fin of a vehicle. The linear actuation system includes a pin pivotably connected to an output rod of a linear actuator to pivot about the output rod as the linear actuator moves the output rod. The pin is further configured to slide into and out of a bushing in an output shaft as the pin pivots to rotate the output shaft. The linear actuation system can be used to actuate a fin of a vehicle and the bushing can serve multiple purposes, namely it is the structure used by the pin to rotate the output shaft while also acting as a pivot point of the fin.

Figure 1:
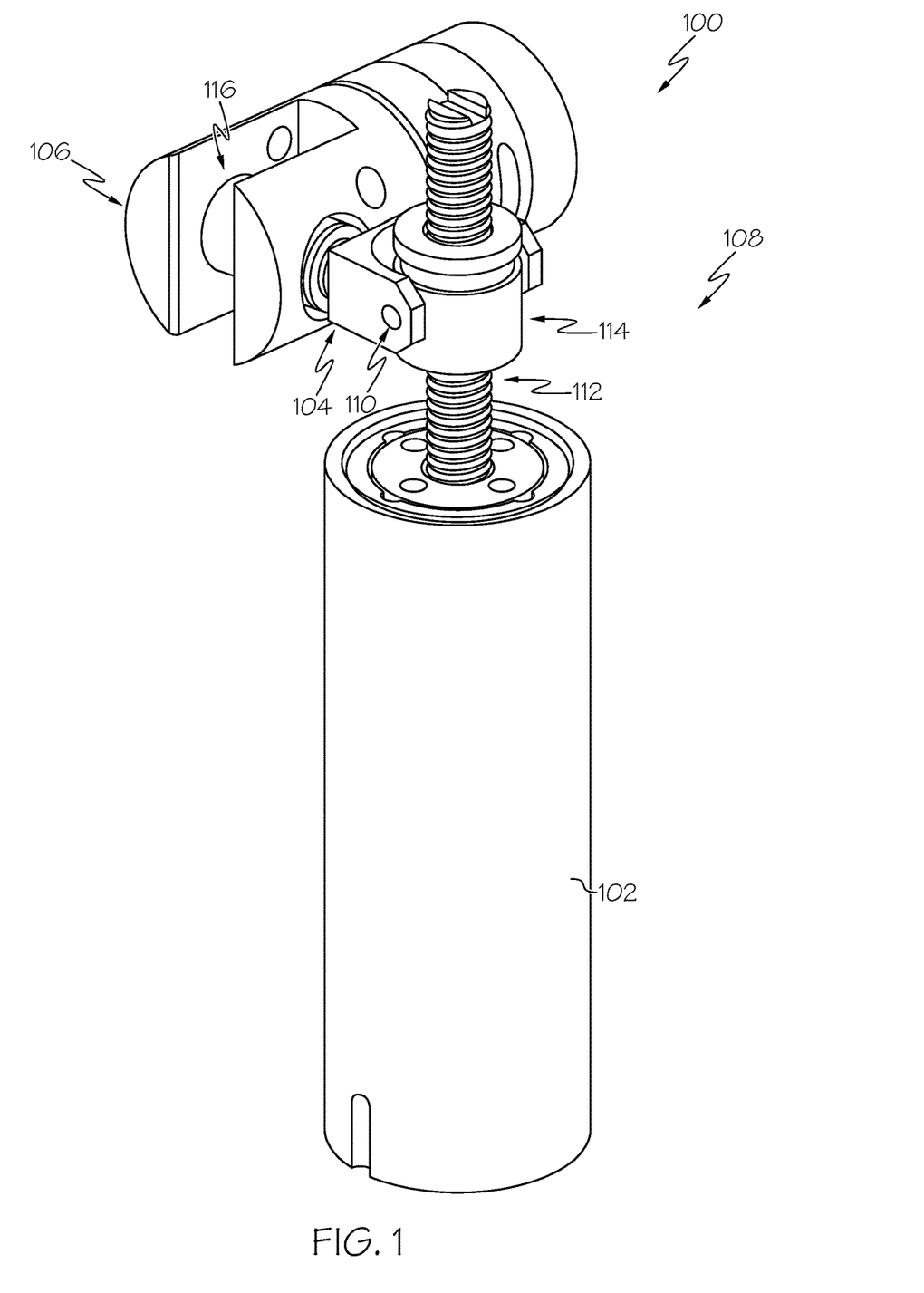
FIG. 1 is a view of a linear actuation system that includes pin and bushing arrangement according to an embodiment of the disclosure.

Turning now to FIG. 1, a linear actuation system 100 is illustrated that includes an actuator 102, a pin 104 pivotably connected to the actuator 102 to pivot as the actuator 102 moves, and an output shaft 106 positioned to rotate as the pin 104 travels in and out of the output shaft 106 in response to movement of the actuator 102. Any suitable actuator type that causes pivoting of the output shaft, such as linear actuators, rotary motor actuators, thermal actuators, magnetic actuators, electric motor actuators, mechanical actuators, and/or the like. In the embodiments described herein, a linear actuator 102 is used. Any suitable linear actuator 102 can be used, such as a pneumatic linear actuator, a hydraulic linear actuator, a motorized linear actuator, and/or the like. The linear actuator 102 includes an output rod 108 that travels in and out of a body of the linear actuator 102.

The pin 104 can be pivotably connected to the output rod 108 to pivot about the output rod 108 as the output rod 108 is driven by the linear actuator 102. The output rod 108 can take any suitable shape, size, and/or configuration for pivotably connecting the pin 104 thereto. In the embodiments described herein, the connection point 110 between the pin 104 and the output rod 108 functions as the pivot point of the pin 104, but any suitable pivot point may be used.

In the illustrated embodiment, the output rod 108 includes a screw thread 112 and a ball nut 114 rotationally secured on screw thread 112. The pin 104 is pivotably coupled to ball nut 114 and can be positioned on the ball nut 114 to prevent unintentional rotation of the ball nut 114 on the screw thread 112, as will be described below. By using a ball nut 114 on a screw thread 112, the position of the pin 104 with respect to the body of the linear actuator 102 can be adjusted as desired, instead of a fixed connection point on the output rod 108.

As seen in FIG. 1, the linear actuator 102 and the output shaft 106 are positioned such that movement of linear actuator 102 causes rotation of the output shaft 106 by way of the pin 104. The body of the linear actuator 102 and the output shaft 106 can have fixed locations with respect to each other to facilitate this rotation. More particularly, the pin 104 can configured to slide into and out of the output shaft 106 to rotate the output shaft 106 as the screw thread 112 moves in and out of the body the linear actuator 102. The movement of the screw thread 112 causes the pin 104 to pivot about the screw thread 112 which, in turn, causes the pin 104 to move relative to the output shaft 106, namely sliding into and out of the output shaft 106, which causes the output shaft 106 to rotate. The entire output shaft 106 can be rotated via the pivoting of the pin 104 and/or only a portion may rotate while a second portion remains stationary. For instance, a first portion of the output shaft 106 can be used secure the output shaft 106 at a particular location and remain stationary while a second portion rotates with respect to the first portion in response to the pivoting of the pin 104.

The pin 104 can slide into and out of any suitable portion of the output shaft 106. In the embodiments described herein, the output shaft 106 includes a bushing 116 and the pin 104 slides in the bushing 116. The bushing 116 can be placed at any suitable location with respect to the output shaft 106. For instance, the bushing 116 can be attached to an exterior surface of the output shaft 106 or the bushing 116 can extend through the output shaft 106, as illustrated.

Figure 2:
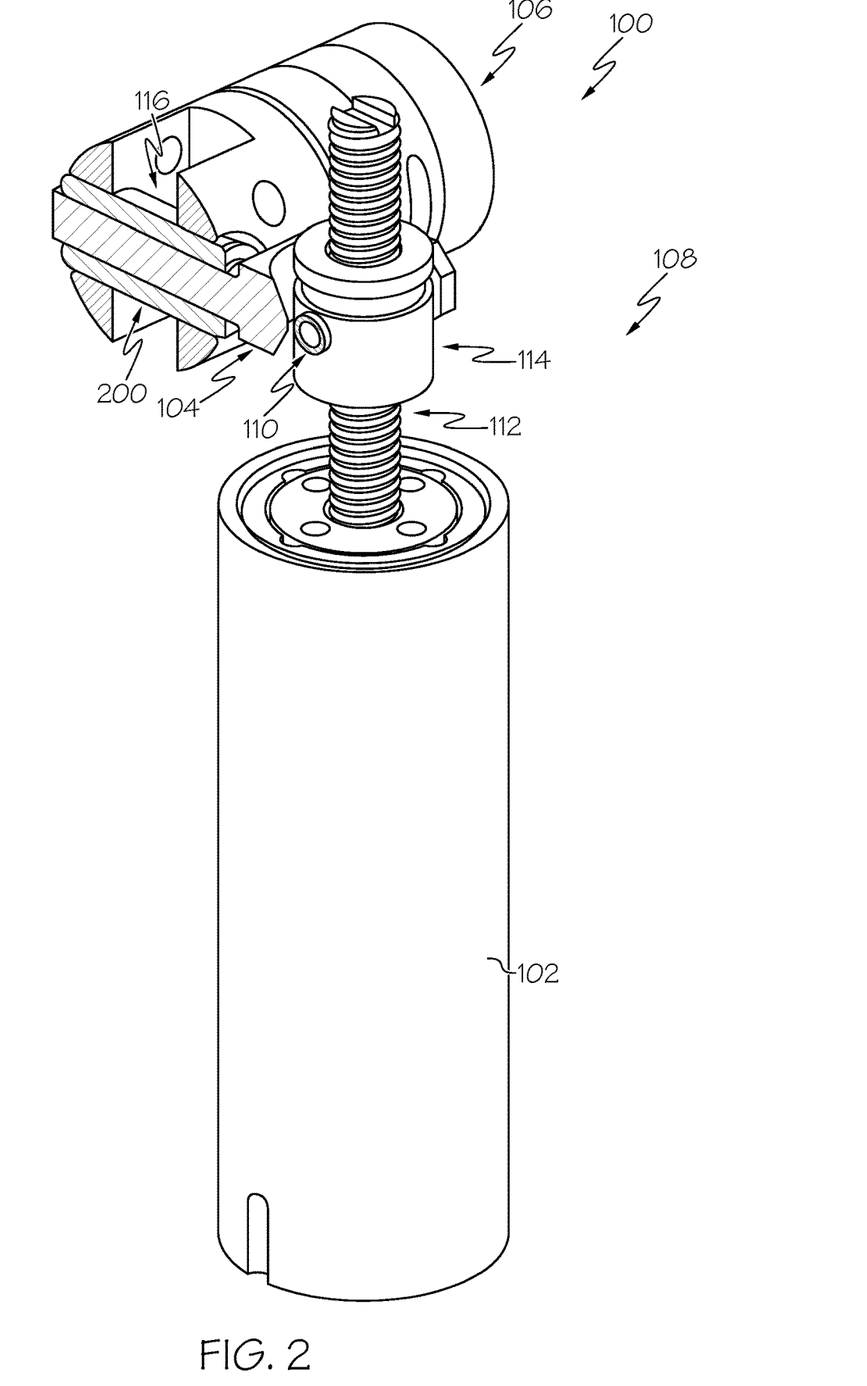
FIG. 2 is a cross-sectional view of the system of FIG. 1.

Turning now to FIG. 2, a cross-sectional view of the linear actuation system 100 of FIG. 1 is illustrated. As can be seen more clearly in FIG. 2, the bushing 116 defines an inner space 200 that extends along a portion of the bushing 116 to accommodate a portion of the bushing 116. In the illustrated embodiment, the space 200 comprises an aperture that extends along an entire length of the bushing 116. In another embodiment, the space 200 comprises an indent that extends a portion of the length of the bushing 116. The pin 104 can extend along any suitable amount of the space 200 when the pin 104 is in a non-pivoted position, and in the illustrated embodiment, the pin 104 extends through an entire length of the bushing 116.

The cross-section of the space 200 and the cross-section of the portion of the pin 104 that slides in the space 200 can take any suitable shape and/or size, e.g., circular, rectangular, triangular, ovular, and/or the like, and may be similar or can vary. For instance, the space 200 can have a first cross-section and the pin 104 can have a second cross-section that is different from the first cross-section. In the illustrated embodiment, both the space 200 and the portion of the pin 104 both have circular cross-sections.

Figure 3A:
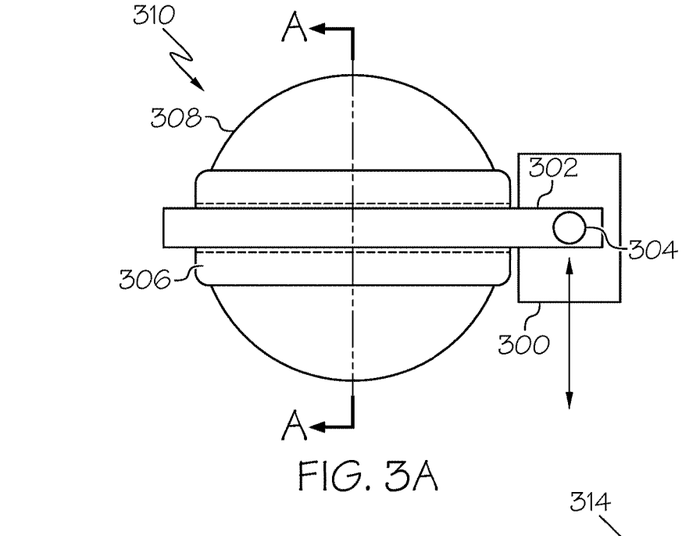
FIGS. 3A, 3B, and 3C are side sectional views of the pin moving in the bushing to rotate the output shaft.
Figure 3B:
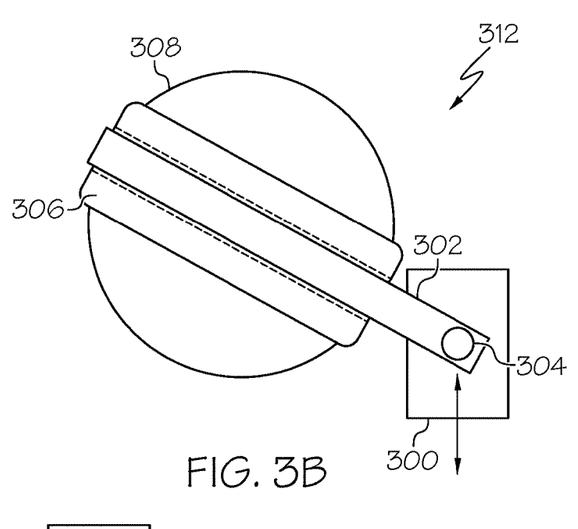
Figure 3C:
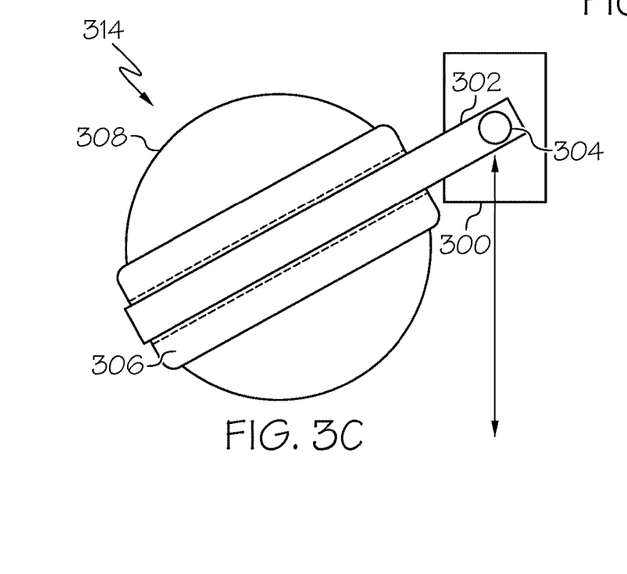

Turning now to FIGS. 3A-3C, an example is illustrated of how movement of the output rod of an actuator causes rotation of an output shaft. The illustrated output rod 300 is configured to travel linearly, i.e., up and down in the illustrated view. The output rod 300 includes a pin 302 that pivots with respect to the output rod 300 about pivot point 304, that is also the connection point of the pin 302 to the output rod 300, as the output rod 300 travels linearly. A portion of the pin 302 extends into a bushing 306 within an output shaft 308. In an initial position 310, FIG. 3A, the pin 302 is perpendicular to the output rod 300 and the pin 302 extends through the entire bushing 306 such that a portion extends out of the bushing 306.

In a second position 312, FIG. 3B, the output rod 300 travels downward from the initial position 310, which causes the pin 302 to pivot clockwise about the pivot point 304. The pivoting of the pin 302 causes the pin 302 to slide out of the bushing 306, which in turn causes the output shaft 308 to rotate clockwise about a central axis of the output shaft 308.

In a third position 314, FIG. 3C, the output rod 300 travels upward from the initial position 310, which causes the pin 302 to pivot counterclockwise about the pivot point 304. The pivoting of the pin 302 causes the pin 302 to slide out of the bushing 306, similar to the second position 312. This causes the output shaft 308 to rotate counterclockwise.

Any suitable amount of output shaft rotation is hereby considered, and one or more components of the linear actuation system can be configured to set a maximum rotation of the output shaft. For instance, the shape and size of the pin, the bushing, and/or the attachment point on the linear rod can be used to limit the position. For example, the pin can be shaped to limit the maximum and minimum amount the pin can pivot relative to the output rod. In another instance, the position of the output shaft and/or the actuator can be used to limit the output shaft. For example, the linear actuator and the output shaft can be positioned such that their structure limits the maximum and/or minimum amount of output shaft rotation.

In an exemplary embodiment, the maximum rotation is 180 degrees. In another embodiment, the maximum rotation is less than 180 degrees. In a further embodiment, the maximum rotation is less than 90 degrees. In yet another embodiment, the maximum rotation is 30 degrees.

The above-described linear actuation system can be used for any suitable scenario where rotation of the output shaft is needed in response to linear movement of an actuator. For instance, the linear actuation system can be used to control pivoting of a fin used in aerial and/or submersible vehicles. As an example, the linear actuation system can be used to selectively deploy fins in an aerial vehicle. As another example, the linear actuation system can be used to steer a submersible vehicle by pivoting the fin.

Figure 4:
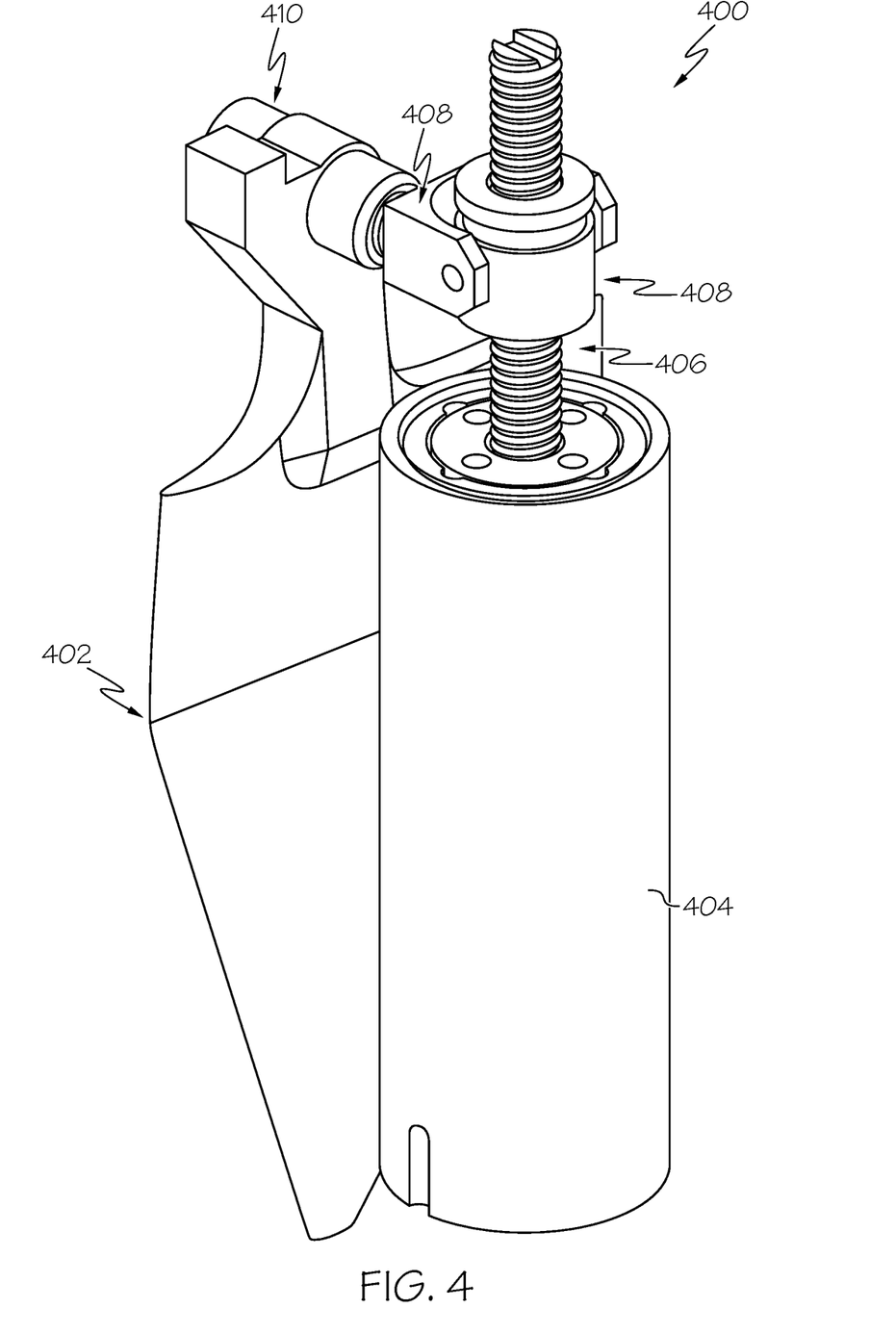
FIG. 4 is a view of a linear actuation system for pivoting a fin according to another embodiment of the disclosure.

Illustrated in FIG. 4 is an exemplary embodiment where a linear actuation system 400 is used to control pivoting of a control surface, such as a fin or a canard 402. The linear actuation system 400 includes a linear actuator 404, a screw thread 406 on an output rod of the linear actuator 404, a ball nut 406, and a pin 408 pivotably connected to the ball nut 406. The pin 408 is configured to slide in a bushing 410 of an output shaft (removed for clarity) to rotate the output shaft, as described above. The canard 402 can be connected to any suitable portion of the output shaft to permit rotation of the output shaft. In the illustrated embodiment, the canard 402 is pivotally connected to the bushing 410. Thus, the bushing 410 can have multiple purposes, namely the bushing 410 can be used to rotate the output shaft as well as act as the pivot point for the canard 402. Any suitable part of the canard 402 can be attached to the bushing 410 and, in the illustrated embodiment, attachment structure 412 of the canard 402 surrounds the bushing 410.

A vehicle (e.g., an aerial vehicle) can include a plurality of control surfaces (e.g., fins) and linear actuation systems can be attached to each of the fins and/or a portion of the plurality of fins. Moreover, separate linear actuation systems can be attached to each of the fins and/or a single linear actuation system can be attached to multiple fins. The linear actuation systems can be attached to any suitable portion of the vehicle.

Figure 5:
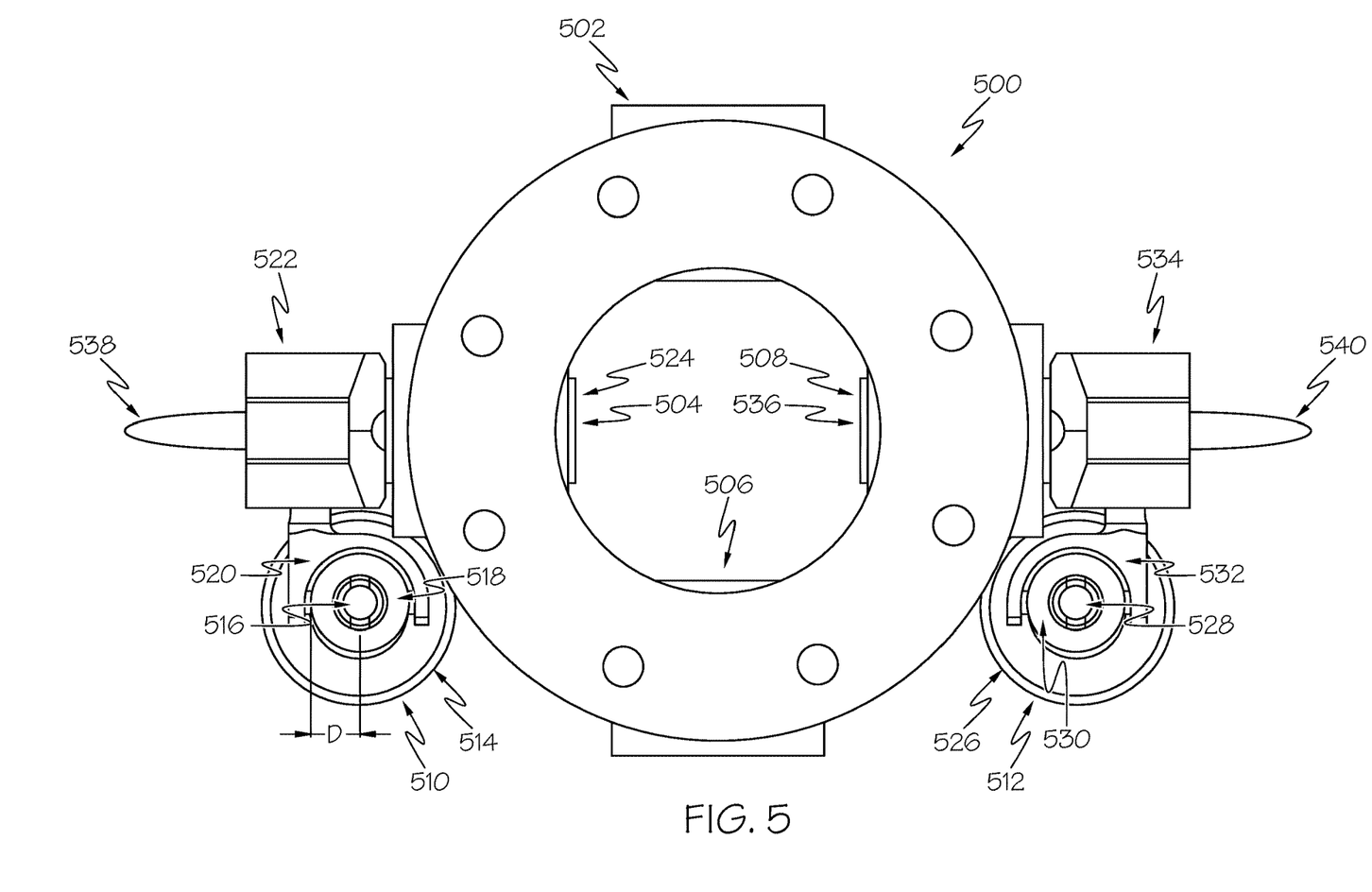
FIG. 5 is a view of a vehicle chassis for pivoting fins of the vehicle according to an embodiment of the disclosure.

Turning now to FIG. 5, illustrated is an embodiment where multiple linear actuation systems are used. The vehicle includes a chassis 500 that includes a plurality of attachment points to receive and secure linear actuation systems to the chassis 500, namely a first attachment point 502, a second attachment point 504, a third attachment point 506, and a fourth attachment point 508 (hereafter, attachment points 502-508). The attachment points 502-508 can have any suitable arrangement on the chassis 500, and in the illustrated embodiment, the chassis 500 is circular and the attachment points 502-508 are evenly spaced around the circle.

All the attachment points 502-508 can have a linear actuation system attached thereto and/or only a portion of the attachment points 502-508 include a linear actuation system. In the illustrated embodiment, the second attachment point 504 and the fourth attachment point 508 have a linear actuation system attached thereto, a first linear actuation system 510 and a second linear actuation system 512, respectively. The first linear actuation system 510 includes a linear actuator 514, a screw thread 516 that travels in and out of the linear actuator 514, a ball nut 518 attached to the screw thread 516, and a pin 520 pivotally attached to the ball nut 518. The pin 520 slidably engages a bushing in a rotating output shaft 522 that is pivotally attached to the second attachment point 504. The first linear actuation 510 can include attachment structure 524 that extends through the second attachment point 504 that movably holds the output shaft 522 on the chassis 500.

Similarly, the second linear actuation system 512 includes a linear actuator 526, a screw thread 528 that travels in and out of the linear actuator 526, a ball nut 530 attached to the screw thread 528, and a pin 532 pivotally attached to the ball nut 530. The pin 532 slidably engages a bushing in a rotating output shaft 534 that is pivotally attached to the second attachment point 508. The second linear actuation 512 can include attachment structure 536 that extends through the fourth attachment point 508 that movably holds the output shaft 534 on the chassis 500.

The first linear actuation system 510 and the second linear actuation system 512 each include a fin pivotably attached thereto, namely fin 538 and fin 540 respectively. The fins 538 and 540 can be the same size and shape (as illustrated) or can vary as needed for the vehicle. The fins 538 and 540 can be attached to any suitable portions of their respective output shafts to pivot in response to rotation of the output shaft. Similar to the linear actuation systems described above, the fins 538 and 540 may be attached to the bushings of their respective output shafts such that the bushing both rotates the output shaft and acts as the pivot point for the fin.

As briefly mentioned above, the pin may be shaped to limit unintentional rotation of the ball nut as the pin pivots and/or the screw thread moves linearly. In an embodiment illustrated in FIG. 5, the pin 520 is shaped such that a central axis of the portion of the pin 520 that slides in the bushing is offset from a center of the screw thread 516 and/or center of the ball nut 518. Offsetting the central axis of the pin 520 from the center of the screw thread 516 and/or center of the ball nut 518 limits unintentional rotation of the ball nut 518 because the drive axis of the pin 520 and the drive axis of the screw thread 516 and/or ball nut 518 are thus offset. The center axis of the pin 520 can be offset by any suitable distance D and may depend on the size of the components of the linear actuation system, fin, vehicle, and/or the like.

Figure 6:
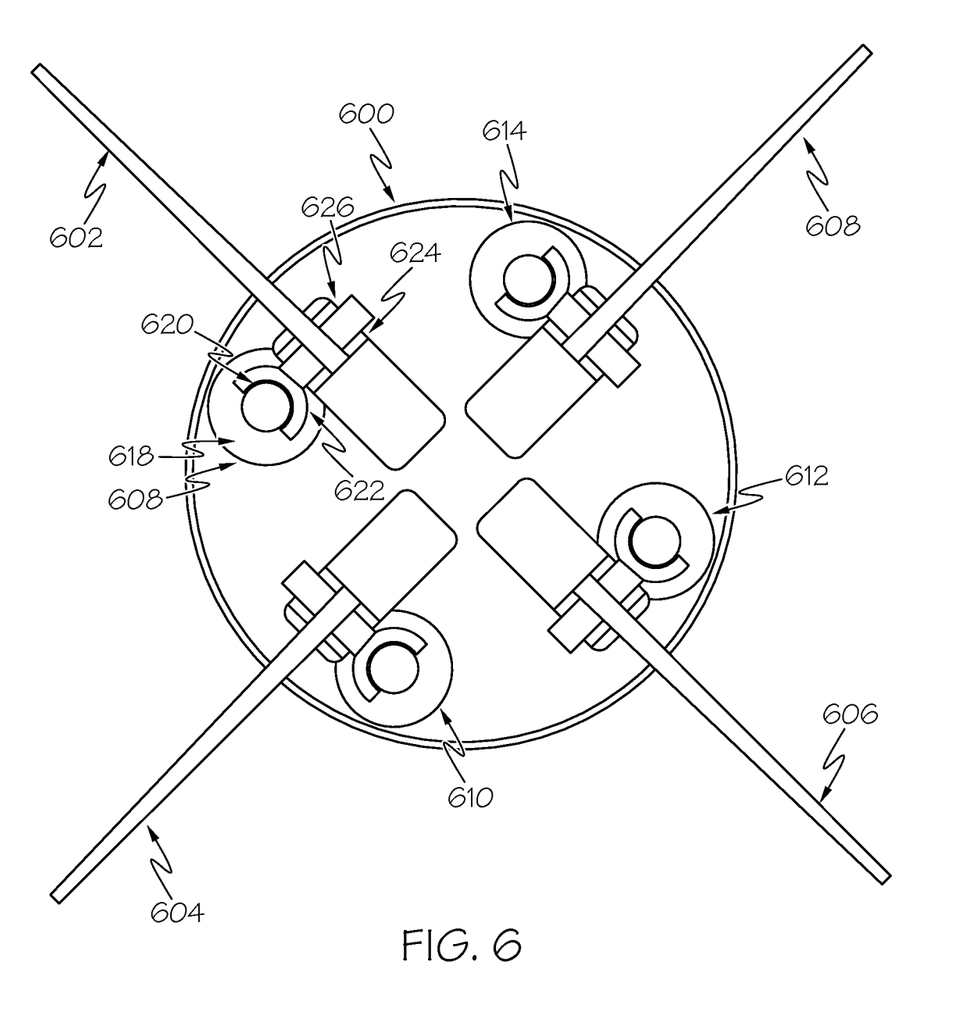
FIG. 6 is a view of a vehicle chassis for pivoting fins of the vehicle according to another embodiment of the disclosure.

Turning now to FIG. 6, illustrated is a top-down cross-sectional view of another embodiment where multiple linear actuation systems are used. The illustrated embodiment, a chassis 600 (e.g., an aerial vehicle such as a missile, a vehicle exterior, vehicle case, and/or the like) defines a body and one or more fins extend from within the chassis 600 into an environment exterior the chassis 600. The chassis 600 includes a first fin 602, a second fin 604, a third fin 606, and a fourth fin 608, collectively the fins 602-608. Each fin can include a separate linear actuation system that actuates the fin, multiple fins can share a linear actuation system, and/or some fins may be fixed and thus, not require a linear actuation system.

In the embodiment illustrated in FIG. 6, each of the fins 602-608 includes a respective linear actuation system. More particularly, the first fin 602 is attached to a first linear actuation system 610, the second fin 604 is attached to a second linear actuation system 612, the third fin 606 is attached to a third linear actuation system 614, and the fourth fin 608 is attached to a fourth linear actuation system 616 (collectively the linear actuation system 610-616). In the illustrated embodiment, the linear actuation systems 610-616 are similar, but they may vary as desired.

Description is now made with reference to the first linear actuation system 610 but can be applied to the other linear actuation systems 612-616. The first linear actuation system 610 includes a linear actuator 618 that drives an output rod 620 linearly. The first linear actuation system 610 further includes a pin 622 pivotably connected to the output rod 620 to pivot as the linear actuator 618 drives the output rod 620. The pin 622 is positioned to slide in a bushing 624 in an output shaft 626 as the pin 622 pivots to drive rotation of the output shaft 626 to actuate the first fin 602.

In the embodiments described above with multiple fins, all the fins can be actuated and/or a portion thereof. Any suitable actuation of the fin is hereby considered, for instance the fin can be actuated from a stowed position within a body of the vehicle to a deployed position, from a first deployed angle to a second deployed angle, and/or the like. In one example with reference to the embodiment illustrated in FIG. 6, two of the fins are actuated or movable while the other two fins are fixed. In another example with reference to the embodiment illustrated in FIG. 6, three of the fins are actuated or movable while the last fin is fixed. In a further example with reference to the embodiment illustrated in FIG. 6, all four fins 602-608 are actuated.

Figure 7:
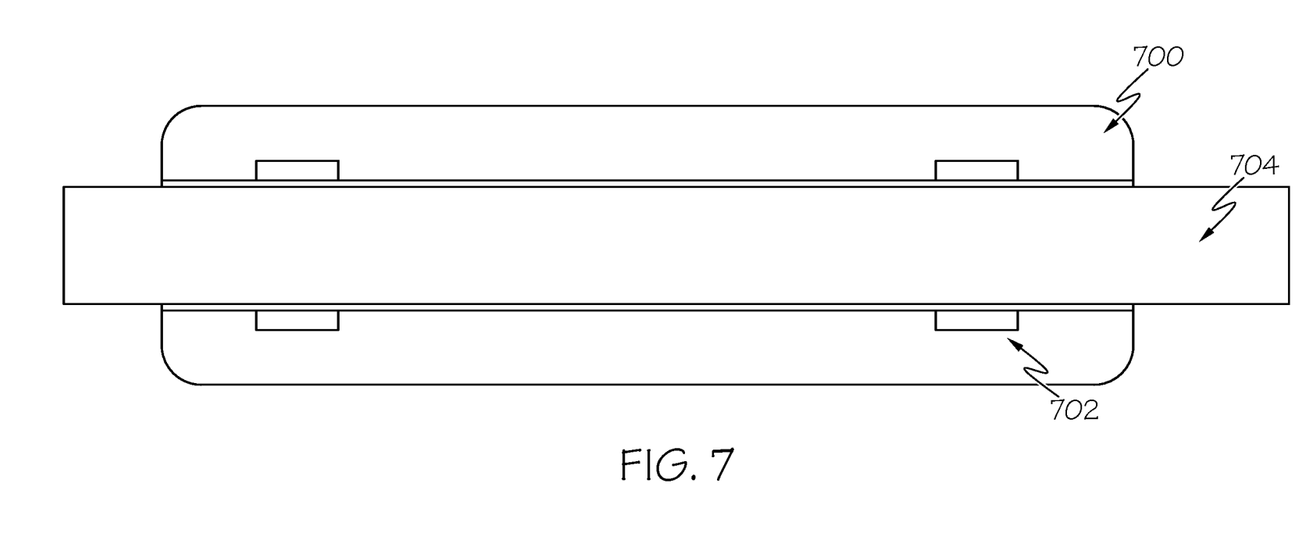
FIG. 7 is a view of a pin in a bushing according to another embodiment of the disclosure.

The linear actuation system described herein can be made of any suitable material and different components can be made of different material. For instance, a first component can be made of a first material while a second component can be made of a second different material. In an example, to make sliding less resistive, the bushing can be made a material that has a lower coefficient of friction compared to material of the pin. In one instance, the pin is made of a steel alloy to withstand pivoting and rotating the output shaft, while the bushing is made of a lower coefficient of friction material, such as bronze, aluminum, and/or the like. The bushing and/or pin may further include a lubricant to lower frictional resistance as the pin slides in the bushing. In an embodiment illustrated in FIG. 7, a bushing 700 may include one or more channels 702 therein that store lubricant therein to lower frictional resistance between the bushing 700 and the pin 704.

Figure 8:
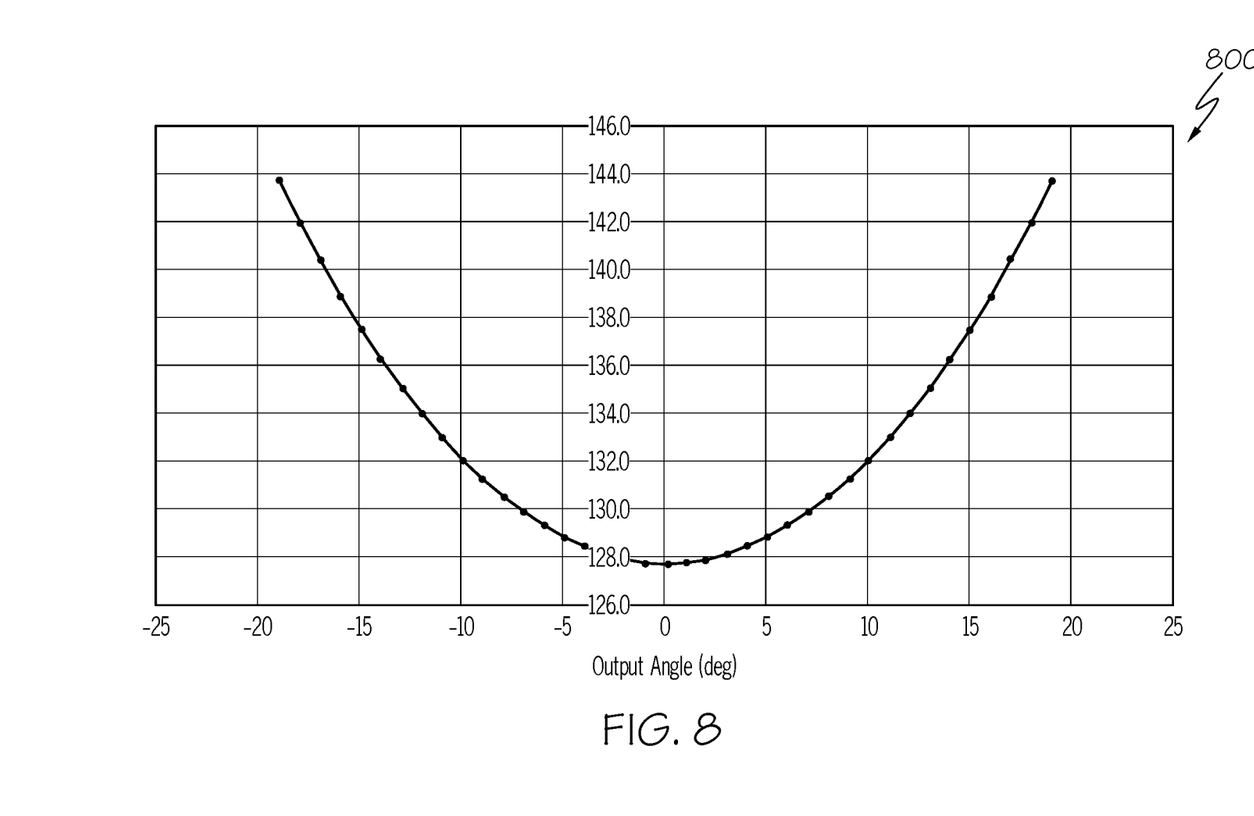
FIG. 8 illustrates a generic graph of torque output of a linear actuation system relative to angle of rotation of an output shaft of the linear actuation system according to an embodiment of the disclosure.

As mentioned above, the linear actuation system described herein provides a gear ratio that increases with the angle of rotation of the output shaft. More particularly, as can be seen in generic graph 800 of FIG. 8 which generically illustrates toque output relative to angle of rotation, torque output of the linear actuation system (indicated by the Y-axis) increases as the angle of rotation of the output shaft increases (indicated by the X-axis).

Figure 9A:
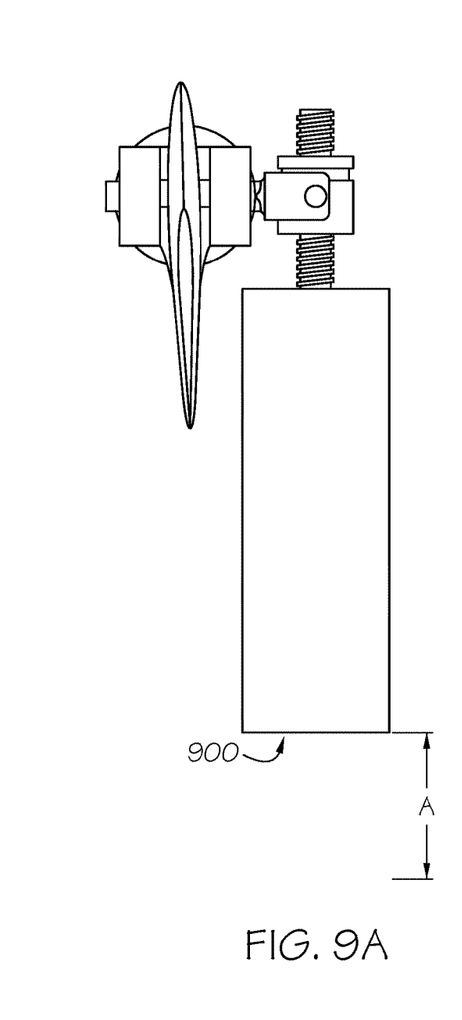
FIGS. 9A, 9B, and 9C illustrate a linear actuation system according to a further embodiment of the disclosure compared to conventional linear actuation systems.

Moreover, the above-described linear actuation system provides multiple benefits compared to traditional systems. For example, because of the way the pin fits the in bushing, hertzian contact loads are lower on the pin compared to conventional actuation systems. This fit allows the linear actuation system to absorb and distribute higher stress loads, e.g., up to 20,000 g-force, than conventional actuation systems. As noted above, conventional scotch yoke actuation systems 910, illustrated in FIG. 9C, rely on tightly machined slots 912 that define the movement path of the pin 914 and that high hertzian forces between the slot 912 and the pin 914 cause deformation of the pin 914 and/or the slot 912.

Figure 9B:
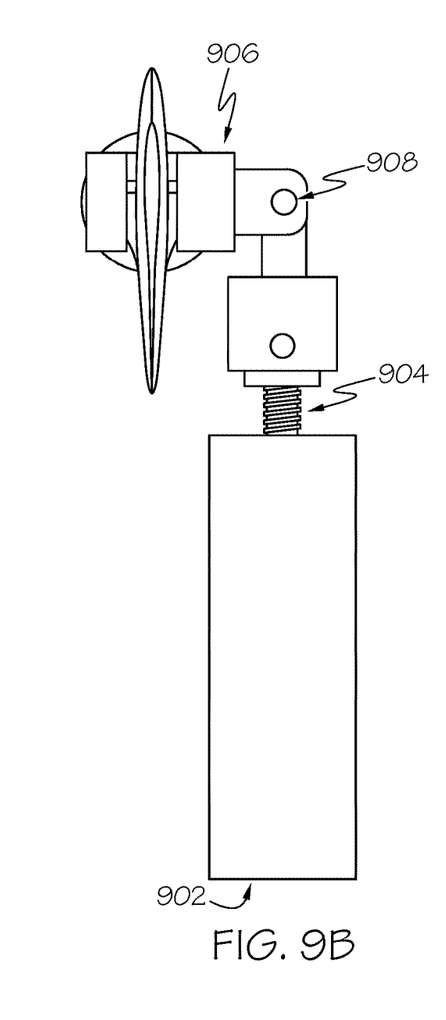
Figure 9C:
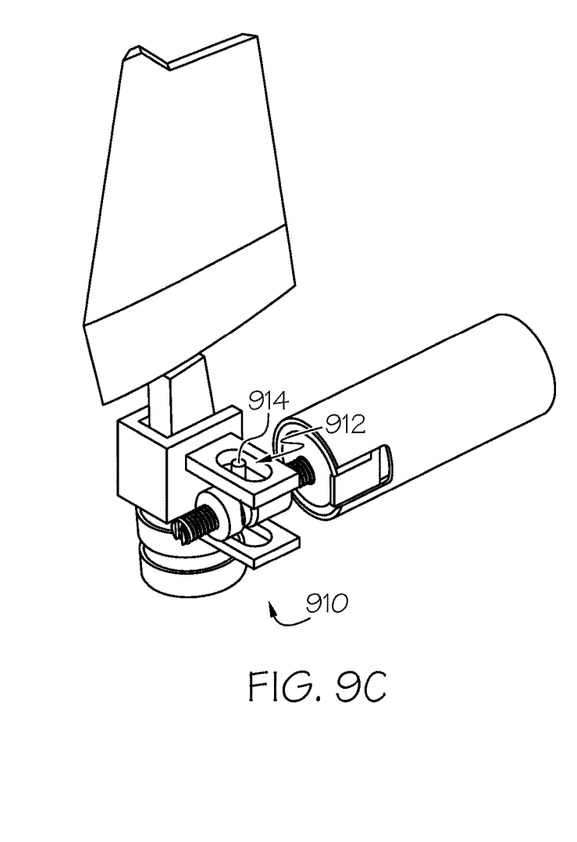

Furthermore, the arrangement of the ball nut, pin, and bushing allow for a more compact linear actuation system. This can be seen in FIG. 9A, which illustrates a linear actuation system 900 according to the embodiments described above and a conventional drag-link linkage system 902 used to perform similar operations. As seen in FIG. 9B, the drag-link linkage system 902 is considerably larger than the linear actuation system 900 because the linkage system 902 includes at-least a first pin 904, a second pin 906, and an extra link 908 connecting the first pin 904 and the second pin 906. This linkage arrangement increases the amount of the space required to accommodate the linkage system 902 (e.g., such as illustrated distance A), as well as decreasing the amount of torque output of the system as the angle of rotation of the output shaft increases.

Figure 10:
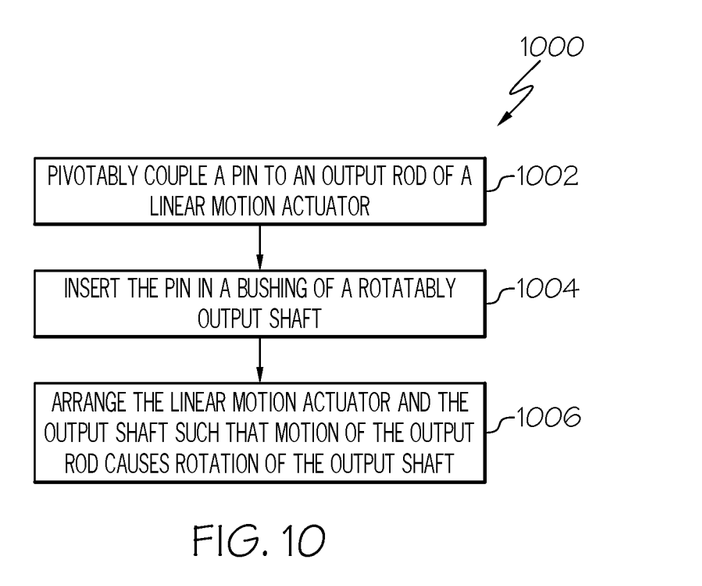
FIG. 10 is a high-level flow chart of a method according to an embodiment of the disclosure.

FIG. 10 shows a high-level flow chart of a method 1000 of manufacturing the linear actuation system 100. In step 1002, a pin 104 (FIG. 1) is pivotably coupled to an output rod 108 of a linear motion actuator 102. In step 1004, the pin 104 is inserted in a bushing 116 (FIG. 1) of a rotatable output shaft 106 such that the pin is configured to slide in and out of the bushing in response to movement of the linear motion actuator. In step 1006, the linear motion actuator and the output shaft are arranged such that motion of the output rod of the linear motion actuator causes rotation of the output shaft.

Although the disclosure shows and describes certain preferred embodiment or embodiments, it is obvious that equivalent alterations and modifications will occur to others skilled in the art upon the reading and understanding of this specification and the annexed drawings. In particular regard to the various functions performed by the above described elements (external components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. An actuation system comprising:
    a pin, one end of the pin pivotably coupled to an output rod of a linear motion actuator; and
    an output shaft constrained to rotate about a central axis, said output shaft including a bushing therein, wherein the opposite end of the pin extends into the bushing,
    wherein linear movement of the output rod pivots the one end of the pin, which causes the opposite end of the pin to slide in and out of the bushing,
    wherein the linear motion actuator and the output shaft are arranged such that travel of the opposite end of the pin in the bushing causes rotation of the output shaft about the central axis.

2. The actuation system of claim 1, wherein the linear motion actuator comprises a pneumatic actuator.

3. The actuation system of claim 1, wherein the linear motion actuator comprises a hydraulic actuator.

4. The actuation system of claim 1, wherein the output rod of the linear motion actuator includes a screw thread and a ball nut on the screw thread, wherein the end of the pin is pivotably coupled at a fixed pivot point to the ball nut.

5. The actuation system of claim 4, wherein a central axis of the pin is offset from a center of the screw thread.

6. The actuation system of claim 1, wherein the pin is made of a first material, wherein the bushing is made of a second material, wherein the second material has a coefficient of friction lower than the first material.

7. The actuation system of claim 1, wherein the output shaft further includes a lubricant, wherein the bushing includes channels to store a portion of the lubricant therein.

8. The actuation system of claim 1, further comprising a control surface pivotably attached to the output shaft, wherein rotation of the output shaft causes pivoting of the control surface, wherein the bushing defines the pivot point of the control surface.

9. The actuation system of claim 1, wherein the linear motion actuator and the output shaft are further arranged such that a maximum rotation of the output shaft is 30 degrees.

10. The actuation system of claim 1, wherein the output shaft is movably connected to a chassis of an aerial vehicle.

11. The actuation system of claim 10, wherein the linear actuation system is in a plurality of actuation systems each separately attached to the chassis of the aerial vehicle.

12. The actuation system of claim 1, wherein the end of the pin is pivotably coupled to the output rod at a fixed pivot point.

13. A method of forming an actuation system for an aerial vehicle comprising:
    pivotably coupling an end of a pin to an output rod of a linear motion actuator;
    constraining an output shaft to rotate about a central axis;
    inserting an opposite end of the pin in a bushing of the output shaft such that linear movement of the output rod pivots the end of the pin, which causes the opposite end of the pin to slide in and out of the bushing; and
    arranging the linear motion actuator and the output shaft such that motion of the output rod of the linear motion actuator causes rotation of the output shaft.

14. The method of claim 13, wherein pivotably coupling the end of the pin to the output rod includes offsetting a central axis of the pin from the center of the output rod when the end of the pin is pivotably coupled to the output rod.

15. The method of claim 13, wherein the output rod includes a screw thread and a ball nut on the screw thread, wherein pivotably coupling the end of the pin to the output rod includes pivotably coupling the end of the pin to the ball nut.

16. The method of claim 13, further comprising pivotably attaching a control surface of the aerial vehicle to the output shaft such that bushing is a pivot point of the control surface.

17. The method of claim 13, further comprising movably securing the output shaft to a chassis of the aerial vehicle.

18. The method of claim 13, wherein the end of the pin is pivotably coupled to the output rod at a fixed pivot point.

19. A control surface actuation system of an aerial vehicle comprising:
- a chassis;
- a first actuation system movably connected to the chassis, wherein the first actuation system comprises:
- a first pin, one end of the first pin pivotably coupled to a first output rod of a first linear motion actuator; and
- a first output shaft constrained to rotate about a first central axis, said first output shaft including a first bushing therein, wherein the opposite end of the first pin extends into the first bushing, wherein linear movement of the first output rod causes the opposite end of the first pin to slide in and out of the first bushing,
- wherein the first linear motion actuator and the first output shaft are arranged such that travel of the opposite end of the first pin in the first bushing causes rotation of the first output shaft about the first central axis;
- a first control surface pivotably attached to the first output shaft pivotably attached to the first output shaft, wherein rotation of the first output shaft causes pivoting of the first control surface, wherein the first bushing defines the pivot point of the first control surface;
- a second actuation system movably connected to the chassis, wherein the second actuation system comprises:
- a second pin, one end of the second pin pivotably coupled to a second output rod of a second linear motion actuator; and
- a second output shaft constrained to rotate about a second central axis, said second output shaft including a second bushing therein, wherein the opposite end of the second pin extends into the second bushing, configured wherein linear movement of the second output rod causes the opposite end of the second pin to slide in and out of the second bushing,
- wherein the second linear motion actuator and the second output shaft are arranged such that travel of the opposite end of the second pin in the second bushing causes rotation of the second output shaft about the second central axis; and
- a second control surface pivotably attached to the second output shaft pivotably attached to the output shaft, wherein rotation of the second output shaft causes pivoting of the second control surface, wherein the second bushing defines the pivot point of the second control surface.

20. The control surface actuation system of claim 19, wherein a central axis of the first pin is offset from a center of the first output rod, wherein a central axis of the second pin is offset from a center of the second output rod.

* * * * *

UNITED STATES PATENT AND TRADEMARK OFFICE
CERTIFICATE OF CORRECTION

| | | |
|---|---|---|
| PATENT NO. | : 12,146,553 B2 | Page 1 of 1 |
| APPLICATION NO. | : 17/820535 | |
| DATED | : November 19, 2024 | |
| INVENTOR(S) | : Stephen C. Silver | |

It is certified that error appears in the above-identified patent and that said Letters Patent is hereby corrected as shown below:

In the Specification

In Column 7, Line 41, delete "508." and insert --504.-- therefor

In the Claims

In Column 10, Line 44, in Claim 11, before "actuation", delete "linear"

Signed and Sealed this
Ninth Day of December, 2025

John A. Squires
*Director of the United States Patent and Trademark Office*